United States Patent [19]
Fauran et al.

[11] 3,870,728
[45] Mar. 11, 1975

[54] DERIVATIVES OF 4'-AMINOMETHYL-DIBENZO (B,E)-11-OXEPINE-2'-SPIRO-1',3'-DIOXOLANE, THEIR METHOD OF PREPARATION AND THEIR THERAPEUTIC APPLICATION

[75] Inventors: Claude P. Fauran, Paris; Jeannine A. Eberle, Chatou; Albert Y. Le Cloarec, Saint-Maur; Guy M. Raynaud, Paris; Bernard M. Pourrias, Meudon la Foret, all of France

[73] Assignee: Delalande S.A., Courbevoie (Hauts de Seine), France

[22] Filed: Jan. 29, 1973

[21] Appl. No.: 327,810

[52] U.S. Cl. .............................. 260/340.9, 424/278
[51] Int. Cl. ............................................ C07d 13/04
[58] Field of Search ............................. 260/340.9

[56] References Cited
UNITED STATES PATENTS
3,726,900   4/1973   Furan et al. ................... 260/340.9

*Primary Examiner*—Donald G. Daus
*Assistant Examiner*—James H. Turnipseed
*Attorney, Agent, or Firm*—Woodhams, Blanchard and Flynn

[57] ABSTRACT

A compound of the formula

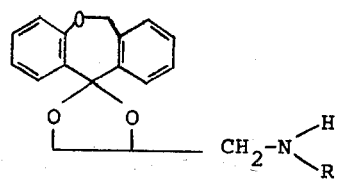

wherein R is an alkyl having 1 to 4 carbon atoms, is prepared by condensing, in a benzene medium, the corresponding 4'-bromomethyl derivative, with R—NH$_2$. The compounds possess analgesic, anti-inflammatory, tranquilizing, hypotensive, vasodilatatory, anti-arythmic, diuretic, spasmolytic, anti-cholinergic, anti-histaminic, anti-ulcerous and anti-serotonine properties.

5 Claims, No Drawings

DERIVATIVES OF 4'-AMINOMETHYL-DIBENZO (B,E)-11-OXEPINE-2'-SPIRO-1',3'-DIOXOLANE, THEIR METHOD OF PREPARATION AND THEIR THERAPEUTIC APPLICATION

CROSS-REFERENCE TO RELATED APPLICATION

This application is related to our application Ser. No. 256,655, filed May 25, 1972.

Ser. No. 256,655 relates to derivatives of 4'-aminomethyl-dibenzo [b,e]-11-oxepine-2'-spiro-1',3'-dioxolane, their method of preparation and their therapeutic application.

More precisely, the derivatives according to Ser. No. 256,655 correspond to the formula:

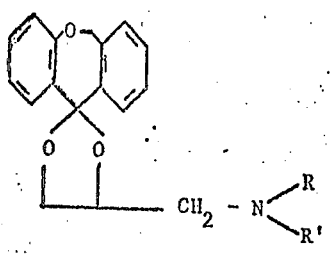

(I$_0$)

in which the nitrogen atom forms part of a tertiary amino group.

The present addition relates to derivatives of the same type, but in which the nitrogen atom forms part of a secondary amino group.

The derivatives according to the addition correspond to the formula:

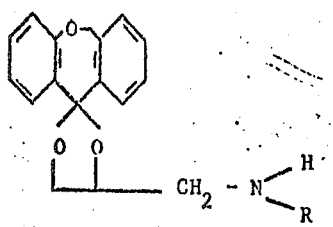

(I)

in which R represents an alkyl radical having from 1 to 4 carbon atoms.

The procedure applicable to this addition is the same as that described in relation to the compounds of formula I$_0$, that is to say, it consists in condensing in a benzene medium, 4'-bromomethyl dibenzo [b,e]-11-oxepine-2'-spiro-1',3'-dioxolane of formula:

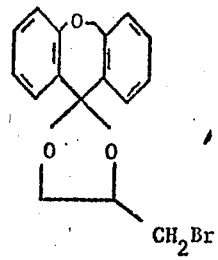

(II)

with a primary amine of formula:

$$R - NH_2$$

in which R has the same significance as in formula (I).

Detailed examples of methods of carrying out such procedure are described in Ser. No. 256,655 to which reference should be made.

The compounds obtained are listed in the following Table I:

TABLE I

| Code No. | R | Empirical Formula | Molecular weight | Melting point °C | Yield % | Elementary analysis calculated | | | Elementary analysis found | | |
|---|---|---|---|---|---|---|---|---|---|---|---|
| | | | | | | C | H | N | C | H | N |
| 72625 | —CH$_3$ | C$_{22}$H$_{23}$NO$_7$ | 413,412 | 184 | 45 | 63.91 | 5.61 | 3.39 | 64.11 | 5.49 | 3.50 |
| 72626 | —C$_2$H$_5$ | C$_{23}$H$_{25}$NO$_7$ | 427,438 | 179 | 56 | 64.62 | 5.90 | 3.28 | 64.64 | 5.72 | 3.43 |
| 72627 | —C$_3$H$_7$ (n) | C$_{24}$H$_{27}$NO$_7$ | 441,464 | 185 | 47 | 65.29 | 6.16 | 3.17 | 65.12 | 6.28 | 3.24 |
| 72634 | —C$_3$H$_7$ (i) | C$_{24}$H$_{27}$NO$_7$ | 441,464 | 157 | 51 | 65.29 | 6.16 | 3.17 | 65.09 | 6.28 | 3.23 |
| 72581 | —C$_4$H$_9$ (n) | C$_{25}$H$_{29}$NO$_7$ | 455,490 | 170 | 50 | 65.92 | 6.42 | 3.08 | 66.01 | 6.58 | 3.13 |
| 72631 | —C$_4$H$_9$ (i) | C$_{25}$H$_{29}$NO$_7$ | 455,490 | 196 | 50 | 65.92 | 6.42 | 3.08 | 66.13 | 6.43 | 3.28 |
| 72763 | —C$_4$H$_9$ (t) | C$_{25}$H$_{29}$NO$_7$ | 455,490 | 198 | 48 | 65.92 | 6.42 | 3.08 | 65.74 | 6.26 | 3.18 |

The compounds of formula (I) have been studied on animals in the laboratory and have been shown to possess analgesic, anti-inflammatory, tranquillising, hypotensive, vasodilatatory, anti-arythmic, diuretic, spasmolytic, anti-cholinergic, anti-histaminic, anti-ulcerous and anti-serotonine properties.

1. ANALGESIC PROPERTIES

The compounds of formula (I), administered by oral means to the mouse, are capable of reducing the number of painful stretchings caused by the intraperitoneal injection of acetic acid.

The results obtained with several of such compounds are given in the following Table II:

TABLE II

| Code No. of compound tested | Dose administered | Reduction in number of painful stretchings |
|---|---|---|
| 72625 | 50 mg/kg p.o. | 85 % |
| 72626 | 40 mg/kg p.o. | 50 % |
| 72627 | 50 mg/kg p.o. | 80 % |
| 72634 | 50 mg/kg p.o. | 45 % |
| 72581 | 80 mg/kg p.o. | 70 % |
| 72631 | 100 mg/kg p.o. | 90 % |

2. ANTI-INFLAMMATORY PROPERTIES

These properties are shown by a diminution of the local oedema caused by the sub-plantar injection of a phlogogenic agent, such as carraghenin, in the rat following the oral administration of compounds of formula (I).

By way of examples, in a dose of 25 mg/kg p.o., the compounds numbered 72625 and 72627 respectively reduce the oedema by 55% and by 50%.

3. TRANQUILLISING PROPERTIES

The compounds of formula (I) preventitively administered by oral means to the mouse, reduce the mortality provoked by the sub-cutaneous injection of cardiazol, Thus, in a dose of 100 mg/kg p.o., compound No. 72631 reduced by 40% the mortality provoked by cardiazol.

4. HYPOTENSIVE PROPERTIES

Administered by intraveinous means to the anaesthetised rat, the compounds of formula (I) cause a lowering of the arterial pressure.

This lowering reached 45%, for 30 minutes, following the administration of 1mg/kg i.v. of compound No. 72627.

5. VASODILATORY PROPERTIES

The compounds of formula (I) are capable of augmenting the flow of the coronary vessels of the isolated heart of a guinea-pig, when said compounds are added in the perfusion liquid of said organ.

The results obtained with two of such compounds are given in the following Table III.

TABLE III

| Code No. of compound tested | Concentration | Augmentation of flow of heart |
| --- | --- | --- |
| 72627 | 0.05 μg/ml | 45 % |
| 72631 | 0.1 μg/ml | 110 % |

6. ANTI- ARYTHMIC PROPERTIES

Administered by intraperitoneal means, the compounds of formula (I) are capable of protecting the mouse against the ventricular fibrillations provoked by the inhalation of chloroform.

The DE 50 of several of the compounds is given in the following Table IV.

TABLE IV

| Code No. of compound tested | Anti-arythmic DE 50 |
| --- | --- |
| 72625 | 23 mg/kg i.p. |
| 72626 | 40 mg/kg i.p. |
| 72627 | 25 mg/kg i.p. |
| 72631 | 45 mg/kg i.p. |
| 72634 | 36 mg/kg i.p. |
| 72581 | 22 mg/kg i.p. |

7. DIURETIC PROPERTIES

The compounds of formula (I), administered by oral means to the mouse simultaneously with a volume of 1 ml of an isotonic solution of sodium chloride per 25g. of the corporeal weight of the mouse, are capable of provoking an augmentation of the volume of urine emitted by reference to control animals, the volume being measured for 4 hours following administration.

Thus, in a dose of 25 mg/kg p.o. Compound Nos. 72625, 72626 and 72631 respectively augment the diuresis by 85%, 70% and 75%.

8. SPASMOLYTIC PROPERTIES

The compounds of formula (I) introduced in the conserving medium, are capable of opposing the contractural action of barium chloride on the isolated duodenum of the rat. This activity is evaluated by taking papaverine as standard.

The results obtained are given in the following Table V:

TABLE V

| Code No. of compound tested | Spasmolytic activity |
| --- | --- |
| 72625 | 3 × papaverine |
| 72626 | 1 × papaverine |
| 72627 | 2 × papaverine |
| 72634 | 2 × papaverine |
| 72581 | 10 × papaverine |
| 72631 | 3 × papaverine |

9. ANTI-CHOLINERGIC PROPERTIES

Injected by intraveinous means, the compounds of formula (I) are capable of opposing the bronchoconstriction provoked in the guinea-pig by the intraveinous injection of acetylcholine and evaluated by the Konzett method.

By the way of example, in a dose of 1 mg/kg i.v., compound No. 72625 inhibited the bronchoconstriction by 70%, for 10 minutes.

10. ANTI-HISTAMINIC PROPERTIES

The compounds of formula (I), introduced in the conserving medium, are capable of opposing the contractural action of histamine on the isolated ileum of a guinea-pig. This activity is evaluated by taking promethazine as standard.

The results obtained with several of such compounds are given in the following Table VI.

TABLE VI

| Code No. of compound tested | Anti-histaminic activity |
| --- | --- |
| 72625 | ⅛ × promethazine |
| 72626 | 1/10 × promethazine |
| 72627 | 1/10 × promethazine |
| 72634 | ¼ × promethazine |
| 72581 | 1/30 × promethazine |
| 72631 | 1/15 × promethazine |

11. ANTI-ULCEROUS PROPERTIES

The compounds of formula (I), administered by oral means, reduce the extent of gastric ulcers provoked in a rat by tying of the pylorus (Shay ulcers).

By way of examples, in a dose of 50 mg/kg i.d.. compound Nos. 72627, 72634 and 72631 reduce the extent of ulcers respectively by 50%, 50% and 40%.

12. ANTI-SEROTONIE PROPERTIES

The compounds of formula (I), administered by intraveinous or intraduodenal means, are capable of opposing the bronchoconstrictural effects of the intraveinous injection of serotonine, these effects being evaluated by the Konzett and Rossler tests, on the guinea-pig.

The results obtained are given in the following Table VII.

TABLE VII

| Code No. of compound Tested | Dose administered | Means of administration | Reduction of Bronchoconstriction | |
|---|---|---|---|---|
| | | | Intensity | Duration |
| 72626 | 2 mg/kg | intraveinous | 70 % | 10 mn |
| 72634 | 2 mg/kg | intraveinous | 40 % | 40 mn |
| 72581 | 100 mg/kg | intraduodenal | 50 % | 75 mn |

As can be seen from the results expressed in the properties shown in 1 to 12 above and those shown in the following Table VIII, the difference between the pharmacologically active dose and the lethal dose is sufficiently great to permit the compounds of formula (I) to be utilised in therapeutics.

TABLE VIII

| Code No. of compound tested | Approximate DL 50 mouse |
|---|---|
| 72625 | 450 mg/kg p.o. |
| 72626 | 400 mg/kg p.o. |
| 72627 | 475 mg/kg p.o. |
| 72634 | 550 mg/kg p.o. |
| 72581 | 850 mg/kg p.o. |
| 72631 | 1 100 mg/kg p.o. |

The compounds of formula (I) are useful in the treatment of various pains, espacially inflammatory pains, anxieties, hypertensions with or without oedema, circulatory insufficiencies, cardiac arythmies, visceral spasms, allergies and gastro-duodenal ulcers.

They may be administered by oral means in the form of tablets, dragees and gelules containing 25 to 250 mg of active ingredient (1 to 3 times a day) and in the form of drops containing 0.1 to 0.5% of active ingredient (20 to 50 drops, 2 or 3 times a day), by rectal means in the form of suppositories containing 15 to 200 mg of active ingredient (1 or 2 times a day) and by parenteral means in the form of ampoules containing 5 to 100 mg of active ingredient.(1 or 2 times a day).

Accordingly, the present invention relates to a therapeutic composition, comprising a compound of the general formula (I) together with a therapeutically-acceptable carrier.

What we claim is:

1. A compound having the formula

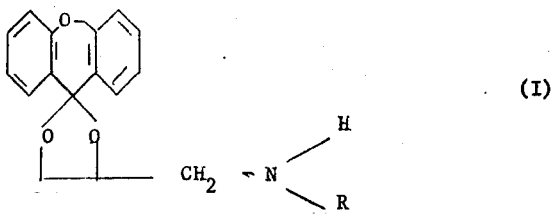

(I)

in which R is alkyl having 1 to 4 carbon atoms.

2. A compound according to claim 1 in which R is methyl.

3. A compound according to claim 1 in which R is n-propyl.

4. A compound according to claim 1 in which R is n-butyl.

5. A compound according to claim 1 in which R is i-butyl.

* * * * *

UNITED STATES PATENT OFFICE
CERTIFICATE OF CORRECTION

Patent No. 3 870 728         Dated March 11, 1975

Inventor(s) Claude P. Fauran, Guy M. Raynaud, Jeannine A. Eberle Bernard M. Pourrias and Albert Y. Le Cloarec It is certified that error appears in the above-identified patent and that said Letters Patent are hereby corrected as shown below:

On the title page, please insert the following information:

---Foreign Application Priority Data
December 15, 1972   France.............72 44842---.

In the title: please change "[B,E]" to ---[b,e]---.

Signed and sealed this 24th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,870,728　　　　　　　　　　Dated March 11, 1975

Inventor(s) Claude P. Fauran, et al

It is certified that error appears in the above-identified patent and that said Letters Patent are hereby corrected as shown below:

The term of this patent subsequent to October 29, 1991, has been disclaimed.

*Signed and Sealed this*

*Sixth Day of July 1976*

[SEAL]

Attest:

RUTH C. MASON
*Attesting Officer*

C. MARSHALL DANN
*Commissioner of Patents and Trademarks*